United States Patent
Voss et al.

(10) Patent No.: US 8,488,010 B2
(45) Date of Patent: Jul. 16, 2013

(54) GENERATING A STABILIZED VIDEO SEQUENCE BASED ON MOTION SENSOR DATA

(75) Inventors: Shane D. Voss, Ft. Collins, CO (US); Wilfred F. Brake, Ft. Collins, CO (US); Andrew C. Goris, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 431 days.

(21) Appl. No.: 12/887,034

(22) Filed: Sep. 21, 2010

(65) Prior Publication Data

US 2012/0069203 A1 Mar. 22, 2012

(51) Int. Cl.
*H04N 5/228* (2006.01)

(52) U.S. Cl.
USPC ............... 348/208.99; 348/208.1; 348/208.2; 348/208.4

(58) Field of Classification Search
USPC .......................................... 348/208.99–208.3
See application file for complete search history.

(56) References Cited

U.S. PATENT DOCUMENTS

| | | | |
|---|---|---|---|
| 7,433,497 B2 | 10/2008 | Chen | |
| 7,548,256 B2 | 6/2009 | Pilu | |
| 7,634,181 B2 | 12/2009 | Washisu | |
| 7,705,884 B2 | 4/2010 | Pinto et al. | |
| 2005/0270380 A1* | 12/2005 | Tomita et al. | 348/208.99 |
| 2006/0061660 A1 | 3/2006 | Brackmann | |
| 2006/0140481 A1 | 6/2006 | Kim et al. | |
| 2007/0236577 A1 | 10/2007 | Ke et al. | |
| 2009/0184849 A1 | 7/2009 | Nasiri et al. | |
| 2011/0085049 A1* | 4/2011 | Dolgin et al. | 348/208.4 |
| 2011/0294544 A1* | 12/2011 | Liang et al. | 455/556.1 |

FOREIGN PATENT DOCUMENTS

WO 2008/114264 A2 9/2008

OTHER PUBLICATIONS

M. Ramachandran et al., "Video Stabilization and Mosaicing"; Jun. 9, 2008; 38 pgs.
N. Joshi et al., "Image Deblurring Using Inertial Measurement Sensors"; 2010; 8 pgs; available at <<http://research.microsoft.com/en-us/um/redmond/groups/ivm/imudeblurring/>>.
M. Drahansky et al., "Acceloerometer Based Digital Video Stabilization for General Security Surveillance Systems"; Jan. 2010; 10 pgs.

* cited by examiner

*Primary Examiner* — Anthony J Daniels

(57) ABSTRACT

A machine-implemented method of generating a stabilized video sequence includes receiving an input video sequence captured by an image capture device. The input video sequence includes a plurality of pairs of successive frames. Motion sensor data indicative of motion of the image capture device while the input video sequence was being captured is received. A set of matching features for each pair of successive frames is identified. Global motion features are identified in each set of matching features and qualified based on the motion sensor data. The global motion features are indicative of movement of the image capture device. A stabilized video sequence is generated based on the input video sequence and the identified global motion features.

20 Claims, 4 Drawing Sheets

GENERATING A STABILIZED VIDEO SEQUENCE BASED ON MOTION SENSOR DATA

BACKGROUND

In general, it is desirable for images or a sequence of images (hereinafter referred to as a "video sequence") captured using an image capture device to be processed, either during capture, or when viewed or played back using video equipment. The processing will generally take the form of filtering or correction of the image or video sequence in order to remove undesirable elements such as motion blur, for example, which may be caused by movement of the image capture device during the capture procedure. Such processing is termed "image stabilization", and is the process which allows an image or video sequence to be captured, stored or rendered with a reduced (or eliminated) amount of apparent motion caused by the secondary, unintentional motion of the image or video sequence capture device with respect to the scene or object being captured, while preserving the dominant, intentional motion of the capture device. The image or video capture device could be a camera (digital or other), or a camcorder (digital or other), or generally, any device capable of capturing an image or sequence of images for storage in the device or elsewhere.

Image stabilization techniques have been used in a wide variety of different applications, including surveillance applications, vehicle-mounted image sensor applications, robotics applications, and consumer electronics applications. Among the primary classes of image stabilization techniques are mechanical image stabilization methods, electromechanical image stabilization methods, optical image stabilization methods, and electronic image stabilization methods. Some existing electronic image stabilization systems attempt to distinguish between global motion and subject motion, but these techniques are not completely accurate and can create false positive detections of global motion, when in fact the motion was subject motion. When a false positive occurs, an attempted correction is typically performed when it should not have been, which produces an incorrect effect in the stabilized video sequence and correspondingly a less desirable video.

For these and other reasons, a need exists for the present invention.

DETAILED DESCRIPTION

Figure 1:
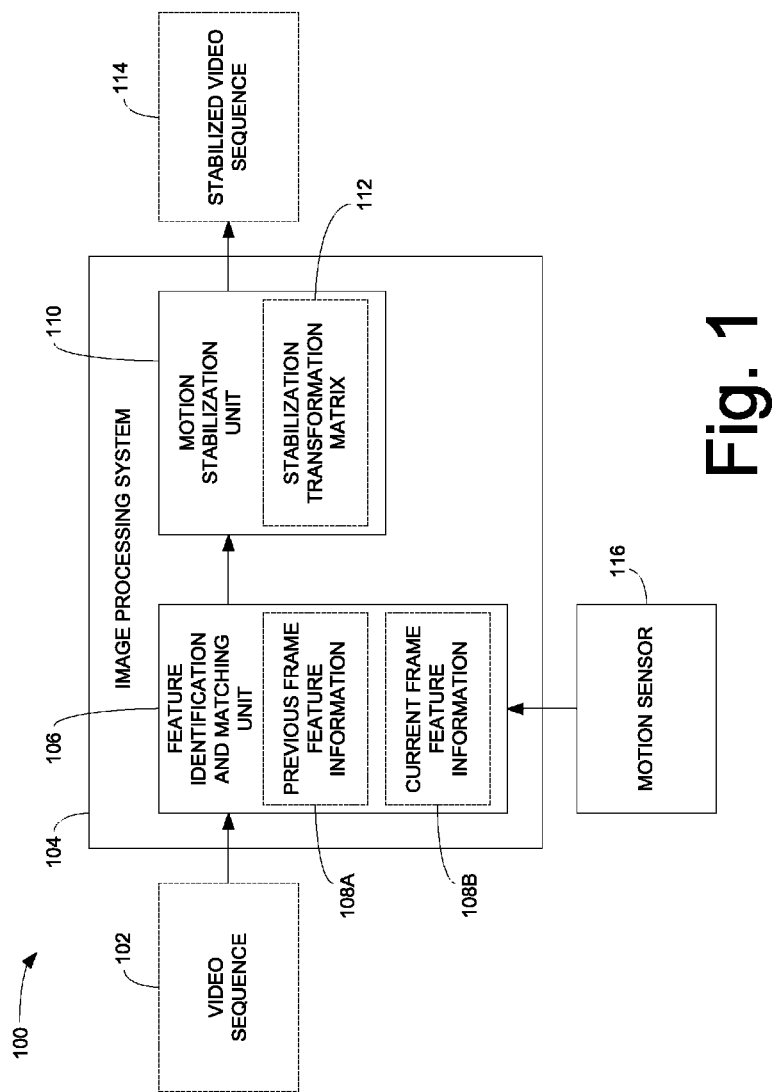
FIG. 1 is a block diagram illustrating a video stabilization system for generating a stabilized video sequence according to one embodiment.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment utilizes image registration techniques to produce a transformation matrix that results in the best mapping of a current frame T onto a previous frame T−1. The result is the best match using image registration techniques of stabilizing frame T in comparison to frame T−1. However, using image registration alone can produce incorrect results in the context of video stabilization. Two kinds of motion can be found between frame T and frame T−1. The first kind of motion is subject motion, which is when a subject is moving between the frames, for example a person moving. The second kind of motion is global motion, which is when the entire scene moves between frames, for example due to camera operator hand shake. In one embodiment, video stabilization is used to correct global motion, but not subject motion.

There are several techniques used in image registration to attempt to distinguish between global motion and subject motion, but these techniques are not 100% accurate and can create false positive detections of global motion, when in fact the motion was subject motion. When a false positive occurs, an attempted correction is typically performed when it should not have been, which produces an incorrect effect in the stabilized video sequence and correspondingly a less desirable video.

The system and method for digital video stabilization according to one embodiment combines feature-based image processing with information provided by one or more motion sensors, such as accelerometers, magnetic field sensors, and gyroscopes. Based on the particular implementation, the combination provides improved performance or improved accuracy, or improved performance and accuracy, compared to systems that do not use motion data in the manner described herein.

One embodiment is directed to a machine-implemented method of generating a stabilized video sequence that includes receiving an input video sequence captured by an image capture device. The input video sequence includes a plurality of pairs of successive frames. Motion sensor data indicative of motion of the image capture device while the input video sequence was being captured is received. A set of matching features for each pair of successive frames is identified. Global motion features are identified in each set of matching features based on the motion sensor data. The global motion features are indicative of movement of the image capture device. A stabilized video sequence is generated based on the input video sequence and the identified global motion features.

Another embodiment is directed to a system for generating a stabilized video sequence. The system includes a feature identification and matching unit configured to receive an input video sequence captured by an image capture device, identify a set of matching features for pairs of successive frames in the input video sequence, and identify global motion features in each set of matching features based on motion sensor data indicative of motion of the image capture device while the input video sequence was being captured.

The global motion features are indicative of movement of the image capture device. The system further includes a motion stabilization unit configured to generate a stabilized video sequence based on the input video sequence and the identified global motion features.

Yet another embodiment is directed to an image capture device that includes an image sensor configured to capture an input video sequence, and a motion sensor configured to generate motion sensor data indicative of motion of the image capture device while the input video sequence is being captured. The system further includes an image processing system configured to receive the input video sequence and the motion sensor data, identify a set of matching features for pairs of successive frames in the input video sequence, identify global motion features in each set of matching features based on the motion sensor data, and generate a stabilized video sequence based on the input video sequence and the identified global motion features, wherein the global motion features are indicative of global motion.

FIG. 1 is a block diagram illustrating a video stabilization system 100 for generating a stabilized video sequence according to one embodiment. System 100 includes image processing system 104 and motion sensor 116. Image processing system 104 includes feature identification and matching unit 106 and motion stabilization unit 110. System 100 is configured in one embodiment to stabilize an input video sequence using an image-based and feature-based technique in combination with mechanical or electro-mechanical motion sensor data generated by motion sensor 116.

Motion sensor 116 generates motion data that is indicative of the motion of the image capture device that captured video sequence 102 while the sequence was being captured, and provides this motion data to the feature identification and matching unit 106. In one embodiment, motion sensor 116 is a linear motion sensor such as a three-axis accelerometer that determines three-dimensional linear motion information. In another embodiment, motion sensor 116 is a rotational motion sensor such as a three-axis gyroscope that determines rotational motion information (i.e., three rotation angles (roll, pitch, and yaw) of the image capture device). In another embodiment, motion sensor 116 is a magnetic field sensor such as a magnetometer. In yet another embodiment, motion sensor 116 is a combination of two or more of the above types of motion sensors and/or other types of motion sensors. In one embodiment, magnetometer data and accelerometer data are combined (e.g., averaged) to improve the accuracy of either type of sensor data alone. In one embodiment, the motion data generated by motion sensor 116 is embedded in each frame of the video sequence for later use, such as by a still-image stabilization algorithm.

The video sequence 102 is provided to unit 106. The video sequence 102 according to one embodiment includes a plurality of frames, and may correspond to an original video sequence captured by an image sensor or a processed version of such an original video sequence. For example, the video sequence 102 may consist of a sampling of the image frames of an original video sequence captured by an image sensor or a compressed or reduced-resolution version of an original video sequence captured by an image sensor.

Unit 106 identifies a plurality of features in each frame of the video sequence 102. For each feature identified in a previous frame (e.g., frame T−1), unit 106 attempts to identify the same feature (i.e., a corresponding or matching feature) in the current frame (e.g., frame T). Block 108A represents the feature information from the previous frame and block 108B represents the feature information from the current frame. In one embodiment, for each feature identified in the previous frame, unit 106 identifies a search window within the current frame (i.e., a subset or smaller portion of the current frame), and searches for that feature within the search window. In one embodiment, the search window is positioned by unit 106 at a position within the current frame that is based on an expected position of the feature. Unit 106 according to one embodiment determines the expected position of the feature and the position of the search window based on motion data provided by motion sensor 116. By using the motion data to help identify where a feature has moved to from one frame to the next, a smaller search window can be used, which improves the performance of the system.

In one embodiment, the motion data is used by unit 106 to identify initial position estimates for features, and these initial estimates are provided to a feature search algorithm. In another embodiment, the motion data is used by unit 106 to verify whether a feature in the current frame actually does correspond to another feature from a previous frame. For example, a conventional feature matching algorithm may identify two features (e.g., a first feature from a previous frame and a second feature from the current frame) as matching features based on a similar appearance of the features. If the movement between the first feature and the second feature matches the motion data provided by sensor 116, the two features will be identified as matching features, and if the movement does not match the motion data, the two features will be identified as non-matching features.

Unit 106 also generates a stabilization transformation matrix 112, and provides this matrix 112 to motion stabilization unit 110. To generate matrix 112, unit 106 compares matching features from pairs of successive image frames in sequence 102, and computes a set of local motion vectors for each pair of successive image frames in sequence 102 (i.e., one local motion vector for each matching feature in the pair of frames). The motion vectors estimate the inter-frame motion of features or objects appearing in the image frames. In general, unit 106 may compute motion vectors based on any model for estimating the motion of image objects. For example, motion vectors may be computed based on an affine motion model that describes motions that typically appear in image sequences, including translation, rotation, zoom, and shear.

Occasionally, the movement of one or more features from one frame to the next may correspond to subject motion (e.g., the movement of an object or person within a scene), rather than global motion (i.e., movement of the image capture device). These features related to subject motion are outliers, and in one embodiment, these outlier features are discarded and not used in the global motion calculation. In one embodiment, unit 106 is configured to use motion data from motion sensor 116 to facilitate the identification of outlier features in each frame that correspond to subject motion rather than global motion. In one form of this embodiment, the outlier features are discarded, and only the features having motion similar to (or matching) the motion data are used for stabilization.

Based on the local motion vectors for the global motion features, unit 106 calculates a global motion vector using robust statistical fitting algorithms such as Ransac. By discarding features that represent subject motion as described above, and only using local motion vectors for the remaining matching features, the accuracy of the calculated global motion vector is improved. The global motion estimate is filtered in one embodiment in order to preserve intentional movement information while filtering out undesirable high frequency information (i.e., unintentional motion or jitter). Unit 106 then generates the stabilization transformation matrix 112 based on the global motion vector, as well as other data, such as motion information provided by motion sensor 116. The transformation matrix 112 is configured to align the current frame (e.g., frame T) with the previous frame (e.g., frame T−1). By using the information provided by motion sensor 116 in the generation of the transformation matrix 112, the accuracy of the stabilization correction is improved. In one embodiment, unit 106 is configured to perform an intelligent voting algorithm (using the feature data, and the motion data from motion sensor 116) to decide the final stabilization parameters to be applied.

The motion data provided by motion sensor 116 helps unit 106 to distinguish the portions of each frame that show subject motion from the portions of the frame that show global motion, and thereby improves the accuracy of the stabilized video sequence. For example, assume that the image registration algorithm performed by unit 106 has detected global motion, yet the motion data provided by sensor 116 indicates no change in motion. This indicates that the image registration has produced a false positive, and has actually detected subject motion instead of global motion. In this case, no correction is performed on the current frame. In previous stabilization systems, the false positive would have been corrected, creating an undesirable effect. As another example, assume that the image registration algorithm performed by unit 106 has detected global motion, and the motion data provided by sensor 116 indicates a significant change in motion indicating a significant shift by the camera operator, such as a sweeping pan. Without utilizing the motion data provided by sensor 116, a correction might be attempted that is outside of the capabilities of the stabilization algorithm, which would produce an unnatural effect in the video. One embodiment uses the motion data provided by sensor 116 in such a case to determine that a stabilization correction is undesirable and so is not performed. The result is a more natural looking video.

Motion stabilization unit 110 synthesizes a stabilized video sequence 114 corresponding to the input video sequence 102, but stabilized based on the stabilization transformation matrix 112. In general, units 106 and 110 of image processing system 104 are not limited to any particular hardware or software configuration, but rather may be implemented in any computing or processing environment, including in digital electronic circuitry or in computer hardware, firmware, device driver, or software. For example, in some embodiments, these units 106 and 110 may be embedded in the hardware of any one of a wide variety of digital and analog electronic devices, including digital still image cameras, digital video cameras, printers, and portable electronic devices (e.g., mobile phones and personal digital assistants). In other embodiments, system 104 may be external to an image capture device and configured to process a video sequence captured by the image capture device. In such embodiments, the motion sensor 116 would be part of the image capture device, and the motion data generated by motion sensor 116 would be provided to system 104 along with the captured video sequence.

Figure 2:
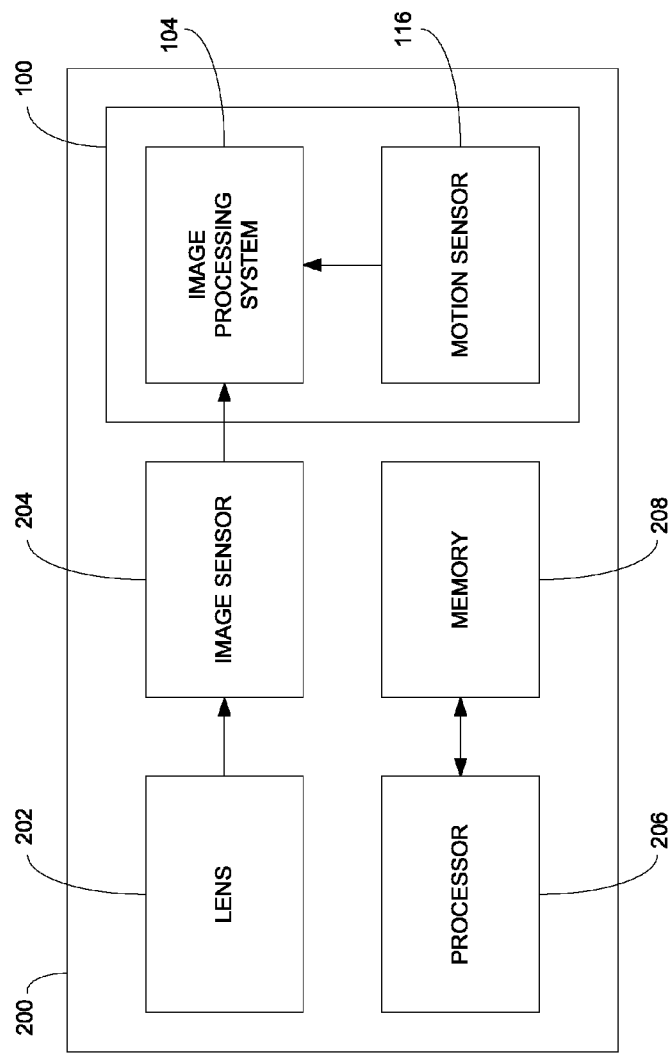
FIG. 2 is a block diagram illustrating an image capture device that includes the video stabilization system shown in FIG. 1 according to one embodiment.

FIG. 2 is a block diagram illustrating an image capture device 200 that includes the video stabilization system 100 shown in FIG. 1 according to one embodiment. Image capture device 200 includes lens 202, image sensor 204, image processing system 104, motion sensor 116, processor 206, and memory 208.

An image or scene of interest is captured from reflected light passing through the lens 202. The image is then converted into an electrical signal by image sensor 204, which could be a CCD (charge-coupled device) or a CMOS (complementary metal oxide semiconductor) device, for example. This image data (e.g., video sequence 102 (FIG. 1)) is then routed to image processing system 104, and processed as described above with respect to FIG. 1 to generate a stabilized video sequence 114 (FIG. 1).

Processor 206 is configured to control elements of image capture device 200, such as one or more of elements 104, 116, 202, 204, and 208. All of the connections between processor 206 and the other elements in device 200 are not shown to simplify the illustration. Memory 208 may be dynamic random-access memory (DRAM) and may include either non-volatile memory (e.g. flash, ROM, PROM, etc.) and/or removable memory (e.g., memory cards, disks, etc.). Memory 208 may be used to store raw digital image data as well as processed digital image data. In accordance with various embodiments, processor 206, memory 208, and image processing system 104 are configured to generate a stabilized video sequence based on an input video sequence and motion data provided by motion sensor 116.

Figure 3:
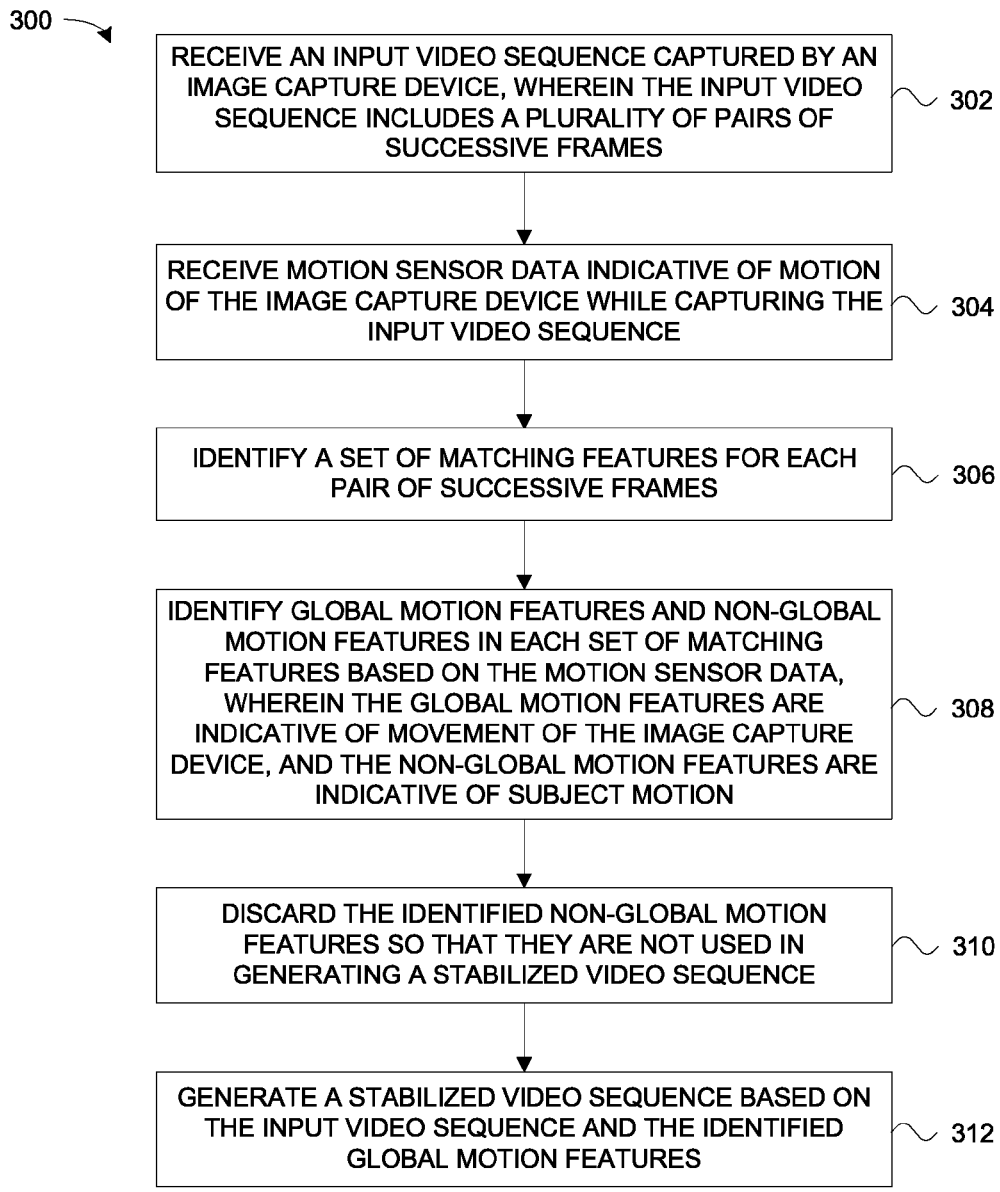
FIG. 3 is a flow diagram illustrating a method for generating a stabilized video sequence according to one embodiment.

FIG. 3 is a flow diagram illustrating a method 300 for generating a stabilized video sequence according to one embodiment. In one embodiment, video stabilization system 100 (FIG. 1) is configured to perform method 300. At 302 in method 300, system 100 receives an input video sequence captured by an image capture device, wherein the input video sequence includes a plurality of pairs of successive frames. At 304, system 100 receives motion sensor data indicative of motion of the image capture device while the input video sequence was being captured. At 306, system 100 identifies a set of matching features for each pair of successive frames. At 308, system 100 identifies global motion features and non-global motion features in each set of matching features based on the motion sensor data, wherein the global motion features are indicative of movement of the image capture device, and the non-global motion features are indicative of subject motion. At 310, system 100 discards the identified non-global motion features so that they are not used in generating the stabilized video sequence. At 312, system 100 generates a stabilized video sequence based on the input video sequence and the identified global motion features.

In one embodiment of method 300, the motion sensor data received at 304 is determined independently from image data in the input video sequence (e.g., it is determined using a non-image-based motion detection technique, such as via a hardware-based linear motion sensor and/or rotational motion sensor). In one embodiment, the motion sensor data in method 300 is generated using at least one of an accelerometer, a gyroscope, and a magnetometer. In another embodiment, the motion sensor data in method 300 is generated using at least two of an accelerometer, a gyroscope, and a magnetometer.

As mentioned above, at 306 in method 300, system 100 identifies a set of matching features for each pair of successive frames. In one embodiment, this identification is accomplished at least in part by identifying a first feature in a first frame of a first pair of the successive frames, and identifying a location of the first feature in a second frame of the first pair of the successive frames based on the motion sensor data. In another embodiment, this identification is accomplished at least in part by identifying a first feature in a first frame of a first pair of the successive frames, identifying a location for a search window in a second frame of the first pair of the successive frames based on the motion sensor data, and searching for the first feature in the search window of the second frame. In yet another embodiment, this identification is accomplished at least in part by identifying a first feature in a first frame of a first pair of the successive frames, identifying a potentially matching feature corresponding to the first feature in a second frame of the first pair of the successive frames, and verifying whether the potentially matching feature actually matches the first feature based on the motion sensor data.

As mentioned above, at 312 in method 300, system 100 generates a stabilized video sequence based on the input video sequence and the identified global motion features. In one embodiment, this is accomplished at least in part by computing local motion vectors based on the identified global motion features, generating a stabilization transformation matrix based on the local motion vectors, and generating the stabilized video sequence using the stabilization transformation matrix.

Figure 4:
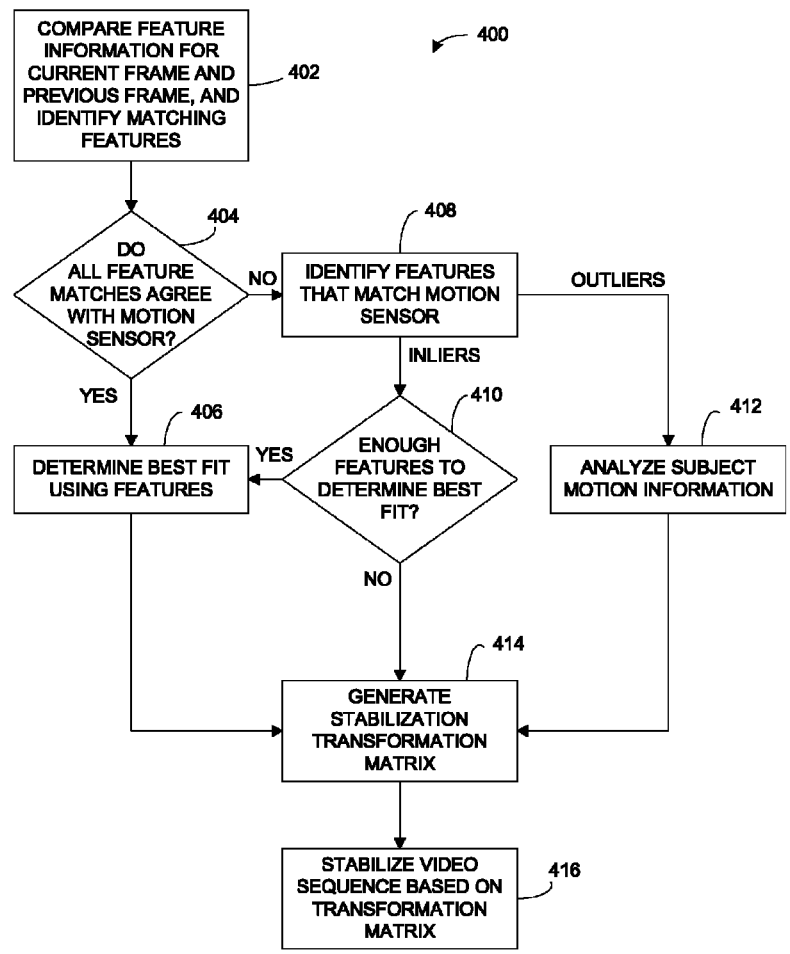
FIG. 4 is a flow diagram illustrating a method for generating a stabilized video sequence according to another embodiment.

FIG. 4 is a flow diagram illustrating a method 400 for generating a stabilized video sequence according to another embodiment. In one embodiment, video stabilization system 100 (FIG. 1) is configured to perform method 400. At 402 in method 400, system 100 compares feature information for a current frame of an input video sequence to feature information for a previous frame of the video sequence, and identifies matching features. At 404 in method 400, system 100 determines whether all of the matching features agree with the motion sensor data generated by motion sensor 116. If it is determined at 404 that all of the matching features agree with the motion sensor data, the method 400 moves to 406, where a best fit technique is performed by system 100 to register the two frames using all of the matching features. The method 400 then moves to 414, which is discussed below.

If it is determined at 404 that not all of the matching features agree with the motion sensor data, the method 400 moves to 408, where system 100 identifies the matching features that match the motion sensor data (i.e., identifies the inliers that match the motion sensor data and the outliers that do not match the motion sensor data). At 410, system 100 analyzes the inlier features, and determines if there are enough inlier features to determine a best fit. If it is determined at 410 that there are enough inlier features to determine a best fit, the method 400 moves to 406, where a best fit technique is performed by system 100 to register the two frames using the inlier features. If it is determined at 410 that there are not enough inlier features to determine a best fit, the method 400 moves to 414, which is discussed below. At 412, system 100 analyzes the outlier features, which are indicative of subject motion, and the method 400 moves to 414.

At 414, system 100 generates a stabilization transformation matrix using the information generated in the previous steps. At 416, system 100 stabilizes the input video sequence based on the stabilization transformation matrix generated at 414.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A machine-implemented method of generating a stabilized video sequence, comprising:
   receiving an input video sequence captured by an image capture device, the input video sequence including a plurality of pairs of successive frames;
   receiving motion sensor data indicative of motion of the image capture device while the input video sequence was being captured;
   identifying a set of matching features for each pair of successive frames;
   identifying a first feature in a first frame of a first pair of the successive frames;
   identifying a location for a search window in a second frame of the first pair of the successive frames based on the motion sensor data;
   identifying global motion features in each set of matching features based on the motion sensor data, the global motion features indicative of movement of the image capture device; and
   generating a stabilized video sequence based on the input video sequence and the identified global motion features.

2. The machine-implemented method of claim 1, wherein the motion sensor data is determined independently from image data in the input video sequence.

3. The machine-implemented method of claim 1, and further comprising:
   generating the motion sensor data with at least one of a linear motion sensor and a rotational motion sensor.

4. The machine-implemented method of claim 1, and further comprising:
   generating the motion sensor data with a linear motion sensor and a rotational motion sensor.

5. The machine-implemented method of claim 1, and further comprising:
   generating the motion sensor data with an accelerometer.

6. The machine-implemented method of claim 1, and further comprising:
   generating the motion sensor data with a gyroscope.

7. The machine-implemented method of claim 1, and further comprising:
   generating the motion sensor data with a magnetometer.

8. The machine-implemented method of claim 1, and further comprising:
   generating the motion sensor data with at least two of an accelerometer, a gyroscope, and a magnetometer.

9. The machine-implemented method of claim 1, and further comprising:
   identifying a location of the first feature in the second frame of the first pair of the successive frames based on the motion sensor data.

10. The machine-implemented method of claim 1, and further comprising:
    searching for the first feature in the search window of the second frame.

11. The machine-implemented method of claim 1, and further comprising:
    identifying a potentially matching feature corresponding to the first feature in the second frame of the first pair of the successive frames; and
    verifying whether the potentially matching feature actually matches the first feature based on the motion sensor data.

12. The machine-implemented method of claim 1, and further comprising:
    identifying non-global motion features in each set of matching features based on the motion sensor data, the non-global motion features indicative of subject motion; and
    discarding the identified non-global motion features so that they are not used in generating the stabilized video sequence.

13. The machine-implemented method of claim 1, and further comprising:
   computing local motion vectors based on the identified global motion features;
   generating a stabilization transformation matrix based on the local motion vectors; and
   generating the stabilized video sequence using the stabilization transformation matrix.

14. A system for generating a stabilized video sequence, comprising:
   a feature identification and matching unit configured to receive an input video sequence captured by an image capture device, identify a set of matching features for pairs of successive frames in the input video sequence, identify a first feature in a first frame of a first pair of the successive frames, identify a location for a search window in a second frame of the first pair of the successive frames based on the motion sensor data, and identify global motion features in each set of matching features based on motion sensor data indicative of motion of the image capture device while the input video sequence was being captured, wherein the global motion features are indicative of movement of the image capture device; and
   a motion stabilization unit configured to generate a stabilized video sequence based on the input video sequence and the identified global motion features.

15. The system of claim 14, wherein the motion sensor data comprises data from at least one of an accelerometer, a gyroscope, and a magnetometer.

16. The system of claim 14, wherein the motion sensor data comprises data from at least two of an accelerometer, a gyroscope, and a magnetometer.

17. The system of claim 14, wherein the feature identification and matching unit is configured to search for the first feature in the search window of the second frame.

18. An image capture device, comprising:
   an image sensor configured to capture an input video sequence;
   a motion sensor configured to generate motion sensor data indicative of motion of the image capture device while the input video sequence is being captured; and
   an image processing system configured to receive the input video sequence and the motion sensor data, identify a set of matching features for pairs of successive frames in the input video sequence, identify a first feature in a first frame of a first pair of the successive frames, identify a location for a search window in a second frame of the first pair of the successive frames based on the motion sensor data, and search for the first feature in the search window of the second frame, identify global motion features in each set of matching features based on the motion sensor data, and generate a stabilized video sequence based on the input video sequence and the identified global motion features, wherein the global motion features are indicative of global motion.

19. The image capture device of claim 18, wherein the motion sensor comprises at least one of an accelerometer, a gyroscope, and a magnetometer.

20. The image capture device of claim 18, wherein the motion sensor comprises at least two of an accelerometer, a gyroscope, and a magnetometer.

* * * * *